(12) United States Patent
Fenner et al.

(10) Patent No.: US 6,243,328 B1
(45) Date of Patent: *Jun. 5, 2001

(54) MODULAR MEDIA STORAGE SYSTEM AND INTEGRATED PLAYER UNIT AND METHOD FOR ACCESSING ADDITIONAL EXTERNAL INFORMATION

(75) Inventors: Knut Thomas Fenner, Westfield, NJ (US); Jan-Christoph Zoels, Brooklyn, NY (US); Rich Gioscia, Mahwah, NJ (US)

(73) Assignees: Sony Corporation, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,139

(22) Filed: Apr. 3, 1998

(51) Int. Cl.⁷ ................................................. G11B 17/22
(52) U.S. Cl. ................................................ 369/30; 369/34
(58) Field of Search .............................. 369/30, 36, 34, 369/38, 32, 47.15, 59.1, 47.16, 53.2, 53.11; 360/19.1, 33.1, 32; 358/341; 340/825.35; 379/67–68; 707/104, 102, 100

(56) References Cited

U.S. PATENT DOCUMENTS

| | | | |
|---|---|---|---|
| 5,386,516 | * | 1/1995 | Monahan et al. .................... 369/30 |
| 5,392,266 | * | 2/1995 | Kobayashi et al. .................. 369/36 |
| 5,440,637 | * | 8/1995 | VanFleet ................................ 381/1 |
| 5,442,500 | * | 8/1995 | Hidano et al. ....................... 360/92 |
| 5,642,337 | * | 6/1997 | Oskay et al. ......................... 369/30 |
| 5,689,481 | * | 11/1997 | Tamura et al. ....................... 369/30 |
| 5,691,964 | * | 11/1997 | Niederlein et al. .................. 369/30 |
| 5,724,321 | * | 3/1998 | Vishlitzky ............................ 369/30 |
| 5,726,956 | * | 3/1998 | Kanno .................................. 369/30 |
| 5,726,957 | * | 3/1998 | Hisamatsu et al. .................. 369/30 |
| 5,751,672 | * | 5/1998 | Yankowski ........................... 369/30 |
| 5,781,889 | * | 7/1998 | Martin et al. ......................... 705/1 |
| 5,959,945 | * | 9/1999 | Kleiman .............................. 369/30 |
| 6,031,795 | * | 2/2000 | Wehmeyer ........................... 369/30 |
| 6,034,925 | * | 3/2000 | Wehmeyer ........................... 369/30 |
| 6,128,625 | * | 10/2000 | Yankowski ......................... 707/104 |

* cited by examiner

Primary Examiner—Ali Neyzari
(74) Attorney, Agent, or Firm—Frommer Lawrence & Haug, LLP; William S. Frommer; Gordon Kessler

(57) ABSTRACT

A recording media storage and player unit, including a playback unit for replaying data retrieved from a selected one of several stored recording media, a communication link for obtaining expanded information associated with the recording medium from an external database, a memory storage location for storing the expanded information locally within the recording media storage and player unit; and a display for displaying the expanded information when the data retrieved from the recording medium is played back. Additional storage and player units are coupleable to the aforementioned unit to increase disc storage capacity. All player units are controlled by a control panel on the first-mentioned unit.

32 Claims, 8 Drawing Sheets

MODULAR MEDIA STORAGE SYSTEM AND INTEGRATED PLAYER UNIT AND METHOD FOR ACCESSING ADDITIONAL EXTERNAL INFORMATION

BACKGROUND OF THE INVENTION

Music recording and reproduction of music has taken many forms, including vinyl recordings, cassette tapes, and now CD-ROM discs, among others. However, while it is possible to read the label from a vinyl record or a cassette tape while music is being reproduced therefrom, typically, when music is being reproduced from a CD-ROM disc, the disc is spinning at a high rate. Additionally, the disc is typically retained within a player, thus either not allowing a view of the disc, or only allowing a partial view of the disc.

Multi-disc CD players pose an additional problem in identifying a disc which is being played or in identifying any of the other discs which are stored within the player and not being played. Multi-disc players include types in which discs are loaded one at a time, or types in which discs are first placed in a multi-disc cartridge, and then the cartridge is loaded into the multi-disc player. In either case, a plurality of discs are retained within the player and are hidden from view. The number of discs can be any number up to 200 discs or more. However, since a user cannot view the discs, the user cannot be sure which discs are within the player unless the user retains a separate list of the identity of each of the discs and the disc's position within the multi-disc player. If the user wishes to play a song from a particular disc, it may not be easy for a user to select that disc out of the plurality of discs from the player, perhaps requiring the user to listen to a beginning portion of each of the discs to determine its identity, which is a very time consuming process.

In order to remedy this problem, some multi-disc players have allowed a user to enter a small number of characters to be associated with a particular disc. The user inserts the disc into the player and then selects a sequence of characters, perhaps the title, to be associated with the disc. These characters are retained in memory in the player with the code of the disc. Anytime the disc is selected to be played, the associated characters are displayed. While this is an improvement, the user is required to enter the information, and the information displayed is very minimal. Also, the user can only view the information when a disc is selected, and thus this process is very slow. In order to find a particular desired disc, a user must still allow the player to read at least the lead code on the disc, search the player memory, and display the associated characters, also a somewhat time consuming process.

Recently, new discs include additional text information regarding the contents of the disc which can be read and displayed by the CD player. Thus, a limited amount of information can be displayed. However, most CD-ROM discs do not have this information included on them.

Additionally, even the discs that do include this information contain only a most limited amount, due to memory constraints, as well as display constraints. Since a typical CD player is likely to have only a small LCD display, only a small amount of information can be displayed at a time. Furthermore, any information contained on the CD must be fixed at the time the CD is produced. Thus, no updated information can be provided.

Therefore, it would be beneficial to provide an apparatus and method for displaying updated information about a particular disc on a CD player, even if the information is not included on the disc.

It would also be beneficial to provide an expanded interface to allow for viewing of extended, updated information, and for aiding in manipulation of disc information.

Audio and video systems typically have many components, including tuners, CD players, video disc players, video tape players, audio tape players, amplifiers and the like. While many systems are partially integrated, it would be beneficial to provide a complete system which is also able to display updated disc information, and which is coupleable to an expanded interface.

OBJECTS OF THE INVENTION

Accordingly, it is an object of the invention to provide an improved CD player which can acquire and display updated disc information.

Another object of the invention is to provide an improved CD-ROM disc player which can store a plurality of discs and display expanded, updated information about each disc.

A further object of the invention is to provide an improved disc player which is adaptable to utilize an enhanced interface to allow for programming control and expanded display.

Yet another object of the invention is to provide an improved, self-contained stereo and multi-disc player which integrates expanded programming features and display.

Still other objects and advantages of the invention will in part be obvious and will in part be apparent from the specification and the drawings.

SUMMARY OF THE INVENTION

Generally speaking, in accordance with the invention, a modular, multi-disc media storage system and multi-disc media integrated player is provided for allowing a plurality of recording media, such as a plurality of CD-ROM discs, to be stored and played back in an efficient manner. The multi-disc storage and integrated player includes a storage area for storing a plurality of recording media, for example CDs, CD-ROM discs, DVD or DVD-R, etc., a playing mechanism for playing one of the stored discs, an interface for allowing a user to play and select a particular disc stored within the apparatus, an expanded user interface allowing a user to perform additional programming features, and a communication link for allowing the multi-disc storage and integrated player unit to download updated information, including text and other visual or audio information, about each of the discs currently retained within the apparatus. The communication link allows the multi-disc storage and integrated player to download updated information regarding each of the discs currently held within the player, to store and collate this information, and to display this information to a user. The user can view a small amount of textual information using a limited integrated interface, or can view extensive textual information, as well as graphic and audio information via an expanded external user interface. The expanded external user interface allows a user to generate a play list by selecting songs from discs by using textual or graphic information, which may include a picture of the front cover art of the disc. In order to obtain the expanded, updated information, the multi-disc storage and integrated player dials into a database, preferably maintained on a web site specifically designed to download the updated CD-ROM information. The more specific features of this expanded external user interface are described in copending application Ser. No. 09/054997, the full contents of which are incorporated herein by reference.

The multi-disc storage and integrated player is designed to be contained within a single, self-contained integrated unit, including AM/FM tuner, DVD player, CD-ROM player, CD-ROM store and other components. Speakers could be included as part of the integrated player. In order to best utilize the multi-disc storage and integrated player, a user plugs in speakers and a telephone line, cable television line, optical fiber, or any other means of data communication in order to download various disc information, including but not limited to title information, and to provide access to the music and web site database for the additional, extended and contextual information.

If the expanded external user interface is to be used, this interface is coupled with the multi-disc storage and integrated player of the invention, and expanded updated textual, graphical and audio information downloaded from the database may be displayed.

Additionally, this expanded interface is adapted to accumulate information regarding the discs contained in the user's system, and the frequency of use of a particular disc. Based upon this information, the downloaded information can include updated news information about an artist which is frequently played, or the like.

Furthermore, the multi-disc storage and integrated player constructed in accordance with the invention is designed to be expandable. Thus, a plurality of player units may be coupled together, or "stacked" and yet still be controlled by a single limited or expanded user interface.

The invention accordingly comprises the several steps and the relation of one or more of such steps with respect to each of the others, and the apparatus embodying features of construction, combinations of elements and arrangement of parts which are adapted to effect such steps, are as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
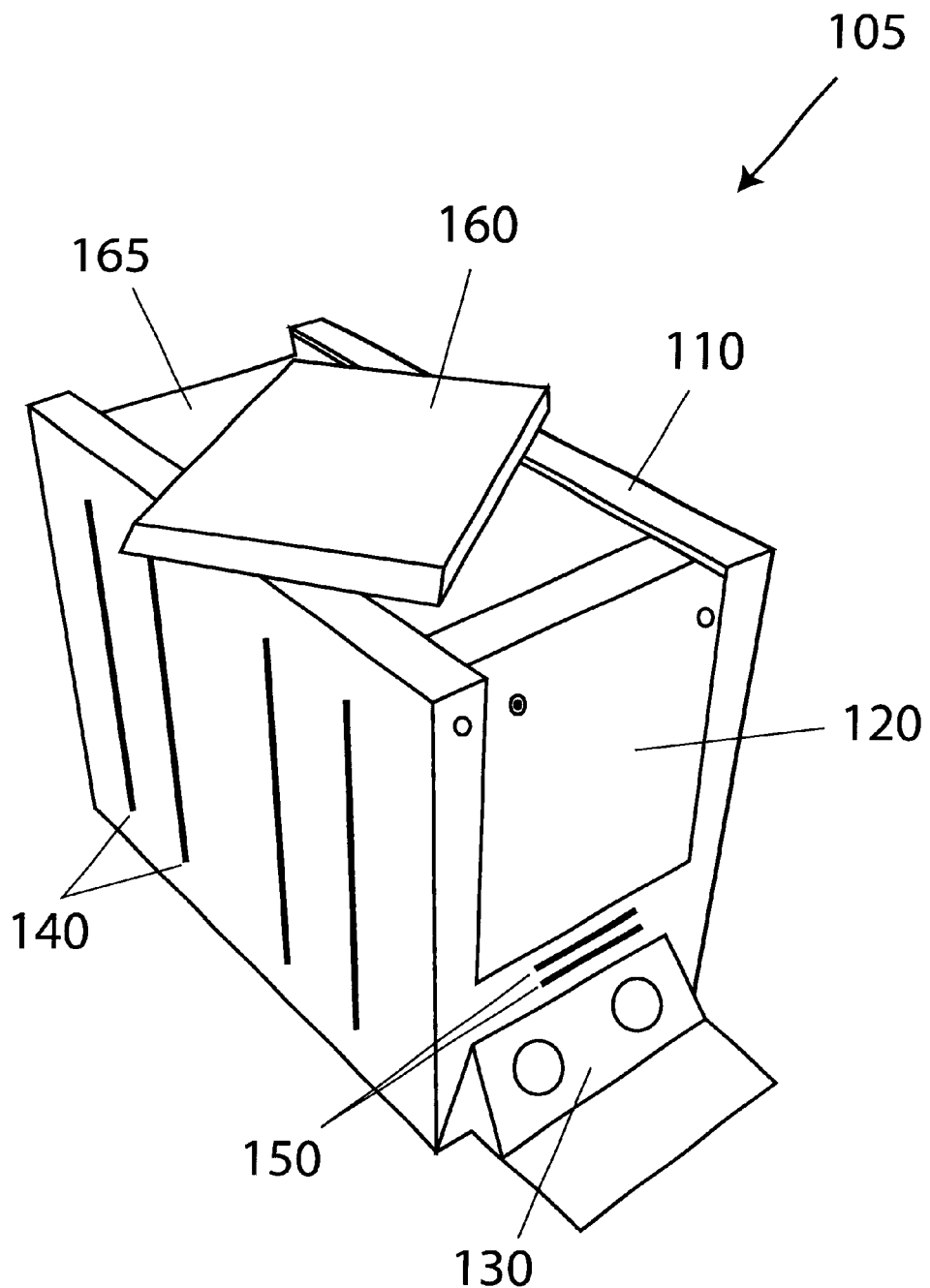
FIG. 1 is a perspective view of a multi-disc storage and integrated player unit constructed in accordance with a first embodiment of the invention.

Reference is first made to FIG. 1 which depicts a multi-disc storage and integrated player unit, indicated generally at 105. While in a preferred embodiment, integrated player unit 105 is adapted to store and play CDs, it could equally be adapted to store and play any other recordable media, such as DVDs, compact discs or the like, or any combination thereof. Multi-disc storage and integrated player unit 105 includes a housing 110, a display screen 120, a flip down control panel 130, side viewing windows 140, CD loading port 150 (FIG. 2), a remote keyboard 160, and a receiving portion 165 formed within housing 110 for receiving remote keyboard 160. An additional loading port may be provided to load other recordable media, or to load a rewritable media, such as a digital audio tape (DAT) or rewritable mini disc, by way of example, so that music may be transferred thereto. Multi-disc integrated player unit 105 is formed with an internal structure able to support approximately 50–100 discs in a vertically stacked manner in a preferred embodiment. This arrangement of internal storage structure is not shown in the figure.

During use, each of the discs is inserted into loading port 150 on the front of integrated player unit 105. Each of these loaded discs is then received internally, and is positioned in an appropriate storage location within integrated player unit 105. Display screen 120 is formed as a transparent glass face, and provides visual access to the internal workings of integrated player unit 105. Flip down control panel 130 is selectively positionable between a first position (not shown) in which the control panel is hidden from view and is in a vertical position with the control panel not being accessible to the user (see FIG. 3), and a second position in which control panel 130 is flipped down and the controls are accessible to the user, as shown in FIG. 1.

Figure 2:
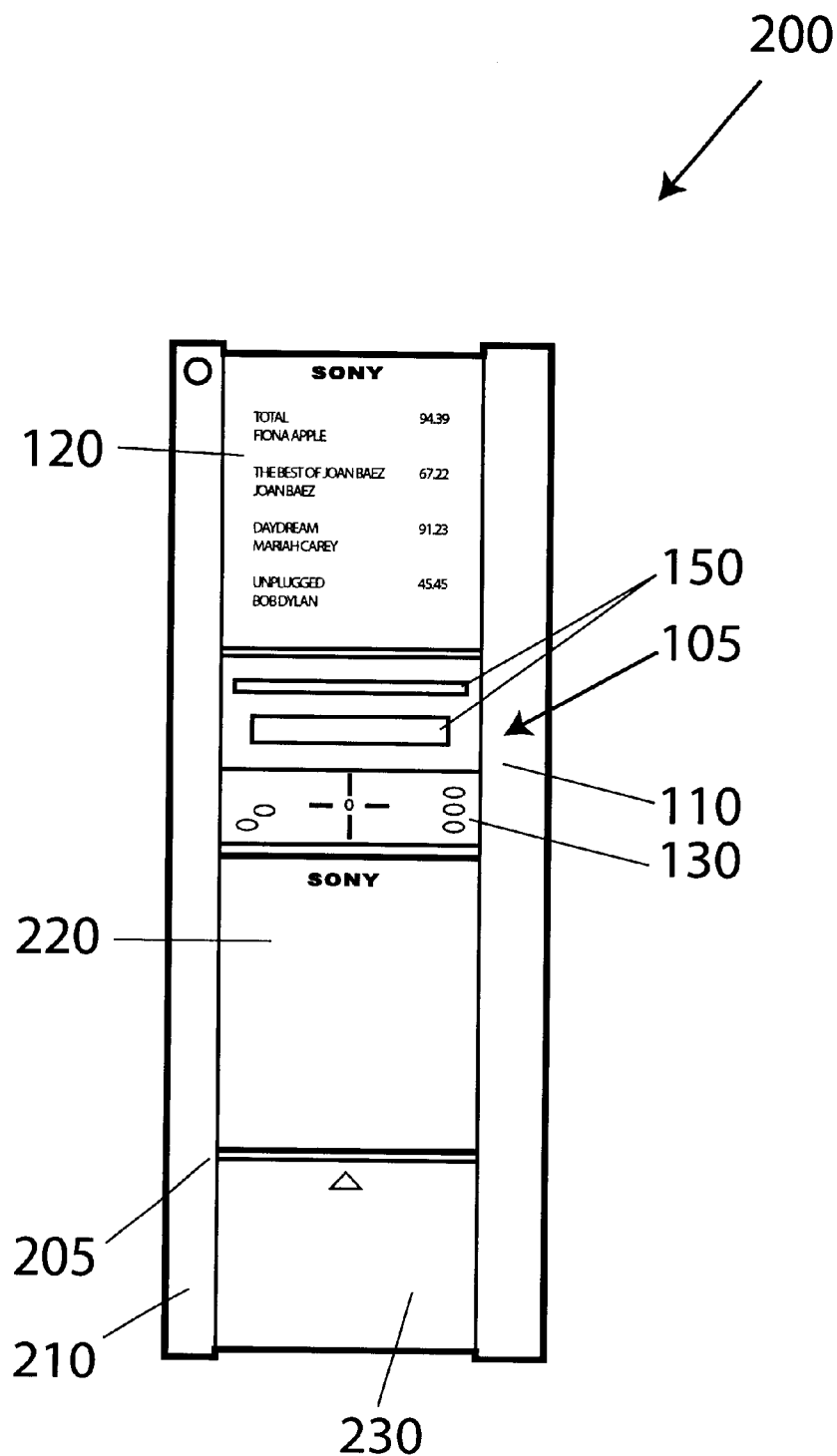
FIG. 2 is a front plan view of a multi-unit, multi-disc storage and integrated player constructed in accordance with an additional embodiment of the invention.

When control panel 130 is positioned in the first position, as noted in FIG. 2, display screen 120 is transparent to the user, and the internal workings of integrated player 105 may be viewed. Upon the movement of control panel 130 from the first position (FIG. 2) to the second position (FIG. 1), display screen 120 becomes translucent, and text information is displayed thereon in order to convey information to the user. This information may include various textual indicia regarding a chosen disc to be played, or any disc which is to be played in the future or which is simply being viewed by the user. The source of this information will be discussed below. Display screen 120 changes from transparent to translucent based upon technology known in the art, and as described in an article in I.D. Annual Design Review 1997 at page 146.

By utilizing the controls on control panel 130, the user can sort through listings for each of the discs retained within integrated player unit 105, select any particular CD or song from a particular CD for play, generate a play list of songs to be played over a period of time in the future, or perform various other functions associated with a standard audio player, such as volume control, AM/FM reception and the like. Control panel 130 is a limited user interface allowing for various integrated user functions to be performed by the user. Additional functions may be provided by an expanded external user interface, as will be discussed below.

Viewing windows 140 are provided to allow the user a side view of the internal workings of integrated player unit 105, and also to view the number of discs contained within the integrated player unit so that a quick visual determination can be made whether additional discs can be loaded therein.

Advantageously, integrated player unit 105 is provided with a wireless keyboard 160 which allows the user to operate control panel 130 remotely, and also allows the user to operate an expanded external user interface, which will be discussed below.

Reference is next made to FIG. 2 which depicts a multi-unit, multi-disc storage and integrated player indicated generally at 200 and constructed in accordance with an alternative embodiment of the invention depicted in FIG. 1. As is shown in FIG. 2, multi-unit, multi-disc storage and integrated player 200 is formed of a first multi-disc storage and integrated player unit 105, such as that shown in FIG. 1, and at least one other multi-disc storage and integrated player unit 205. Storage and integrated player unit 105 is directly coupleable to storage and player unit 205, physically, by stacking as shown, and electrically by the use of internal connections, not shown. It should be noted that it is also possible to connect any further number of storage and player units 205 to the combination 200, and any of the player units 205 need not be physically stacked, by can be placed in any physical formation, as long as the electrical connections are present.

Storage and integrated player unit 105 of FIG. 2 retains all elements shown in FIG. 1, including control panel 130, and display screen 120. In FIG. 2, display screen 120 is in a mode in which it displays various textual information, and therefore is translucent, blocking visual access to the internal structure of the storage and integrated player unit. The information being displayed concerns compact discs contained within player unit 105, and also within each other storage and integrated player unit 205. While each other storage and player unit 205 has its own player, and is adapted to store up to 50 discs in a preferred embodiment, each such other player unit does not contain a control panel such as control panel 130. Nor does it contain a display screen such as display screen 120. Therefore, upon the stacking and coupling of storage and integrated player unit 105 and any number of other storage and integrated player units 205, the textual information regarding all the discs contained within any or all of the units 105 and 205 are displayed from display screen 120 of integrated player unit 105.

Each storage and integrated player unit 205 is provided with a housing 210, a transparent glass screen 220 which does not become translucent as display screen 120 of storage and integrated player unit 105, and a flip down shelf 230, behind which is access to a disc loading port (and a tape or mini-disc loading port in one embodiment) similar to loading port 150 contained within integrated player unit 105. Through these loading ports, compact discs are loaded into each unit 105 and 205 for storage.

Figure 3:
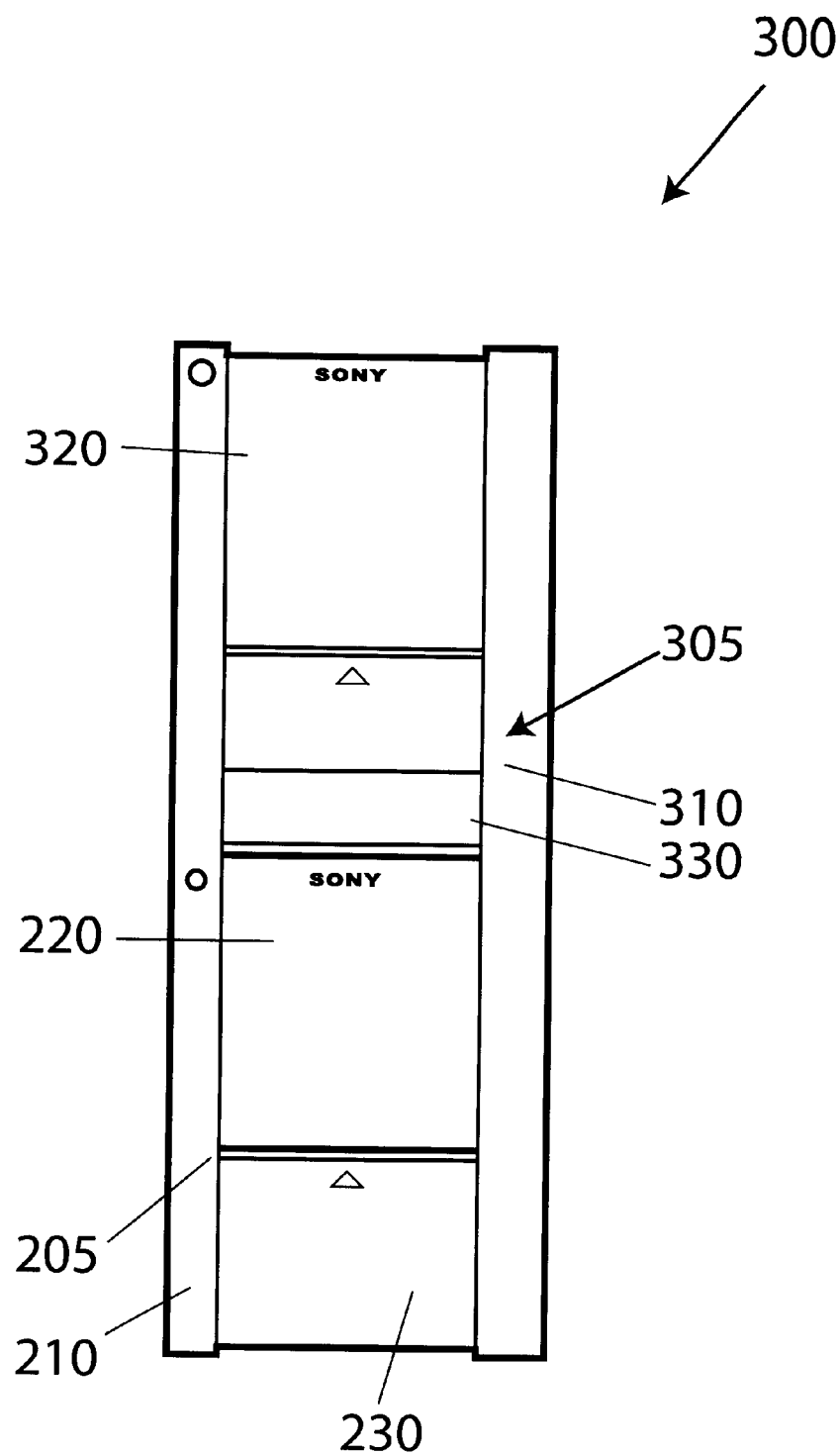
FIG. 3 is a front plan view of the apparatus of FIG. 2 operating in an alternative mode.

FIG. 3 depicts a multi-unit, multi-disc storage and integrated player 300, which is similar to multi-unit, multi-disc storage and integrated player 200, except that control panel 130 has been moved upwardly, thereby closing off disc loading port 150, and thereby blocking the display of textual information from display screen 120. In this configuration, a multi-disc storage and integrated player unit 305, which is similar to player unit 105, is formed with a housing 310, a transparent display screen 320, and a control panel 330. In this embodiment, display screen 320 does not display information, and is therefore transparent. Thus, the user can see the internal workings of storage and integrated player unit 305. Player unit 305 is visually similar to any of the other storage and integrated player units 205 positioned therebelow. An override setting may also be provided which allows the user to display textual information on display screen 120 even after control panel 130 has been moved upwardly.

Figure 4:
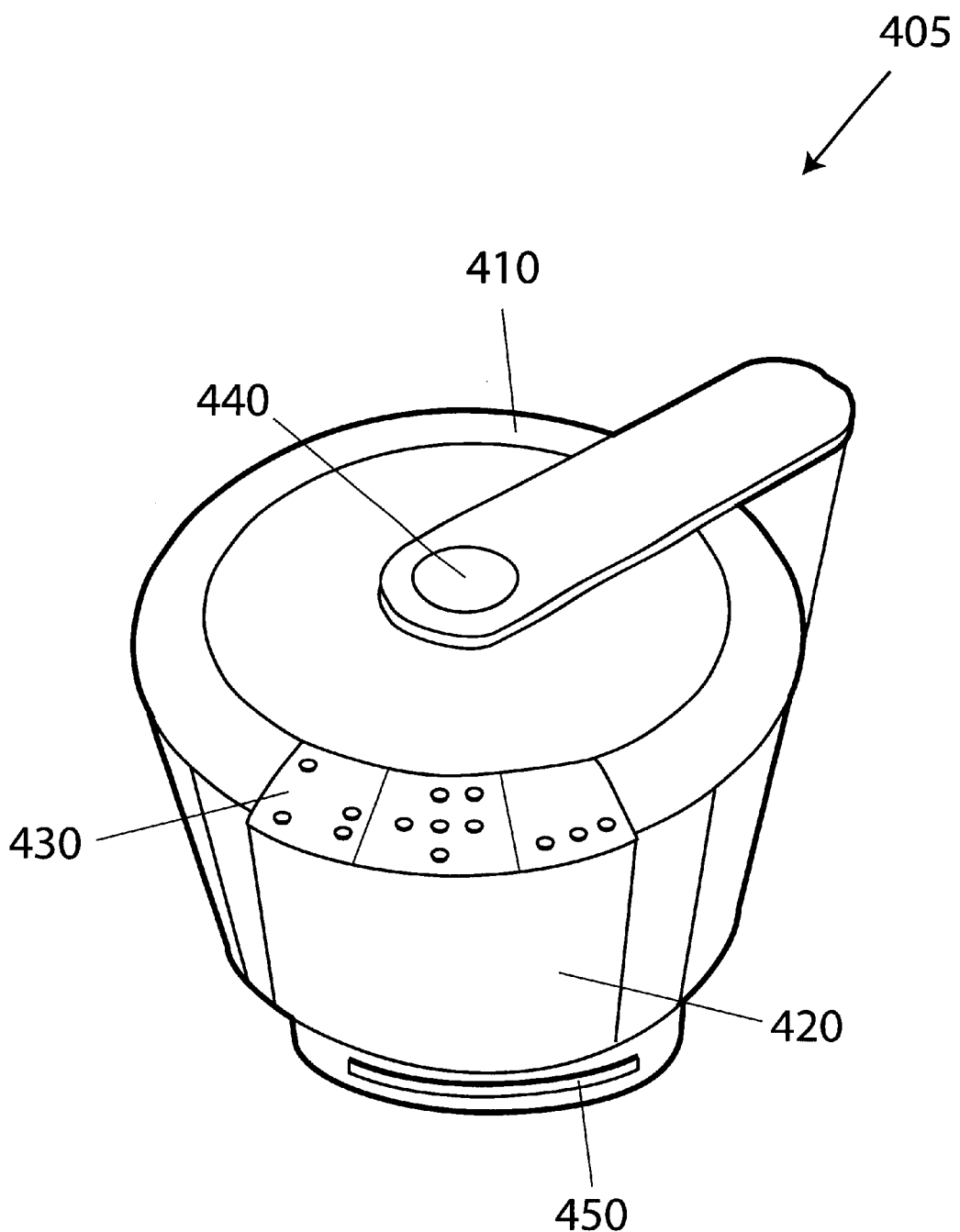
FIG. 4 is a perspective view of a multi-disc storage and integrated player unit constructed in accordance with a second embodiment of the invention.

Reference is next made to FIG. 4 which depicts a multi-disc storage and integrated player unit 405 constructed in accordance with a second embodiment of the invention. This multi-disc storage and integrated player unit 405 stores discs in a circular configuration, and therefore includes a circular housing 410, and a center axial spindle 440 about which a storage casing, not shown, is rotatable. Player unit 405 also includes a display screen 420 similar to display screen 120 of FIG. 1, a control panel 430, and a disc loading port 450. Similar to the embodiment depicted in FIG. 1, when discs are being played within the player unit, display screen 420 is transparent, allowing the user a view of the internal workings of the unit. However, when any function button on control panel 430 is depressed, display screen 420 becomes translucent and textual information regarding the disc being played, or other textual information regarding another disc retained within storage and integrated player unit 405 is displayed. Control panel 430 is a limited integrated user interface allowing for various functions to be performed by the user. Disc loading port 450 is provided for the loading and unloading of individual discs from multi-disc storage and integrated player unit 405.

Figure 5:
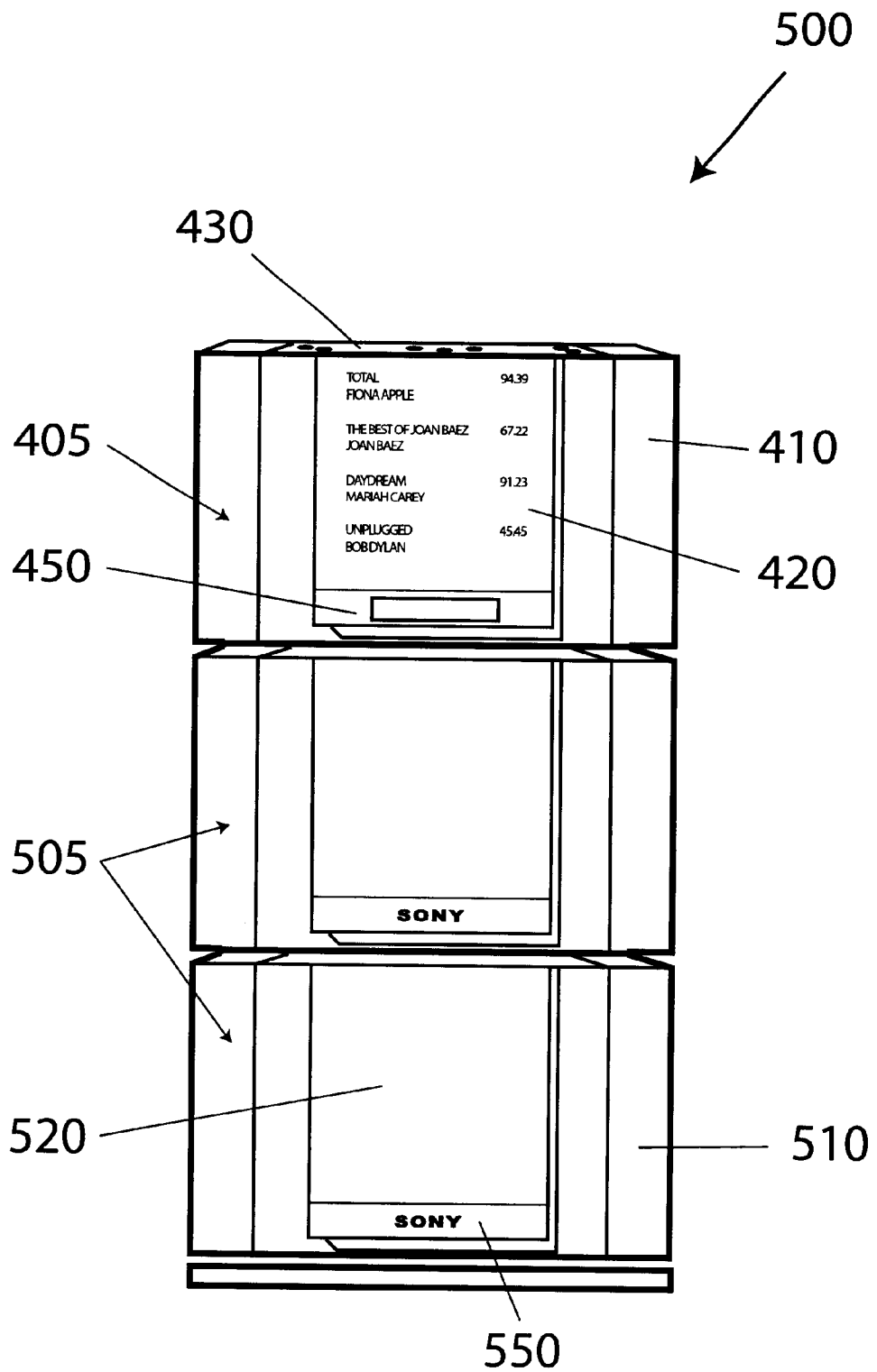
FIG. 5 is a multi-unit, multi-disc storage and integrated player constructed in accordance with an alternative embodiment of the invention.

Reference is next made to FIG. 5 which depicts a multi-unit, multi-disc storage and integrated player 500 constructed in accordance with an alternative embodiment of the invention shown in FIG. 4. Multi-unit player 500 comprises one multi-disc storage and integrated player unit 405 of the type shown in FIG. 4, and at least one additional multi-disc storage and player unit 505. Player unit 405 has all the features shown in FIG. 4. Multi-unit player 500 is shown in FIG. 5 with integrated player unit 405 being operated in a mode in which display screen 420 has become translucent opaque, with textual information displayed thereon, since none of the buttons on control panel 430 have been depressed. Each multi-disc storage and player unit 505 is adapted to be stacked and connected with integrated player unit 405 to transmit audio data and other information therebetween and to form multi-unit player 500. Each player unit 505 is similar to integrated player unit 405, but does not contain a control panel. A display screen 520 in each player unit 505 is formed of a transparent material which remains transparent during use, giving a user visual access to the internal workings of the player unit.

By being electrically interconnected, the display and control of all of the player units 505 is centralized at integrated player unit 405. In this way, a user can simply add additional player units 505 to increase storage capacity of multi-unit, multi-disc storage and integrated player 500 without increasing the complexity of the system.

As noted above with respect to player units 105 and 305 depicted in FIGS. 1–3, integrated player units 405 and 505 may contain AM/FM tuners, and players for all types of media, including DATs, or rewritable mini discs, by way of example, thereby comprising fully integrated players. Thus, only speakers need be connected to each player unit 405, or multi-unit player 500 in order to utilize the apparatus with the limited integrated user interface. Alternatively, speakers might be provided as an integrated part of each of the players. Multi-unit player 500, as well as integrated player unit 405 (as well as each of the prior units 105 and 200 noted above), is adapted to be coupled with either a personal computer, or a television set in order to provide an expanded external user interface which allows for various additional programming features and viewing, as will be described below.

Figure 6:
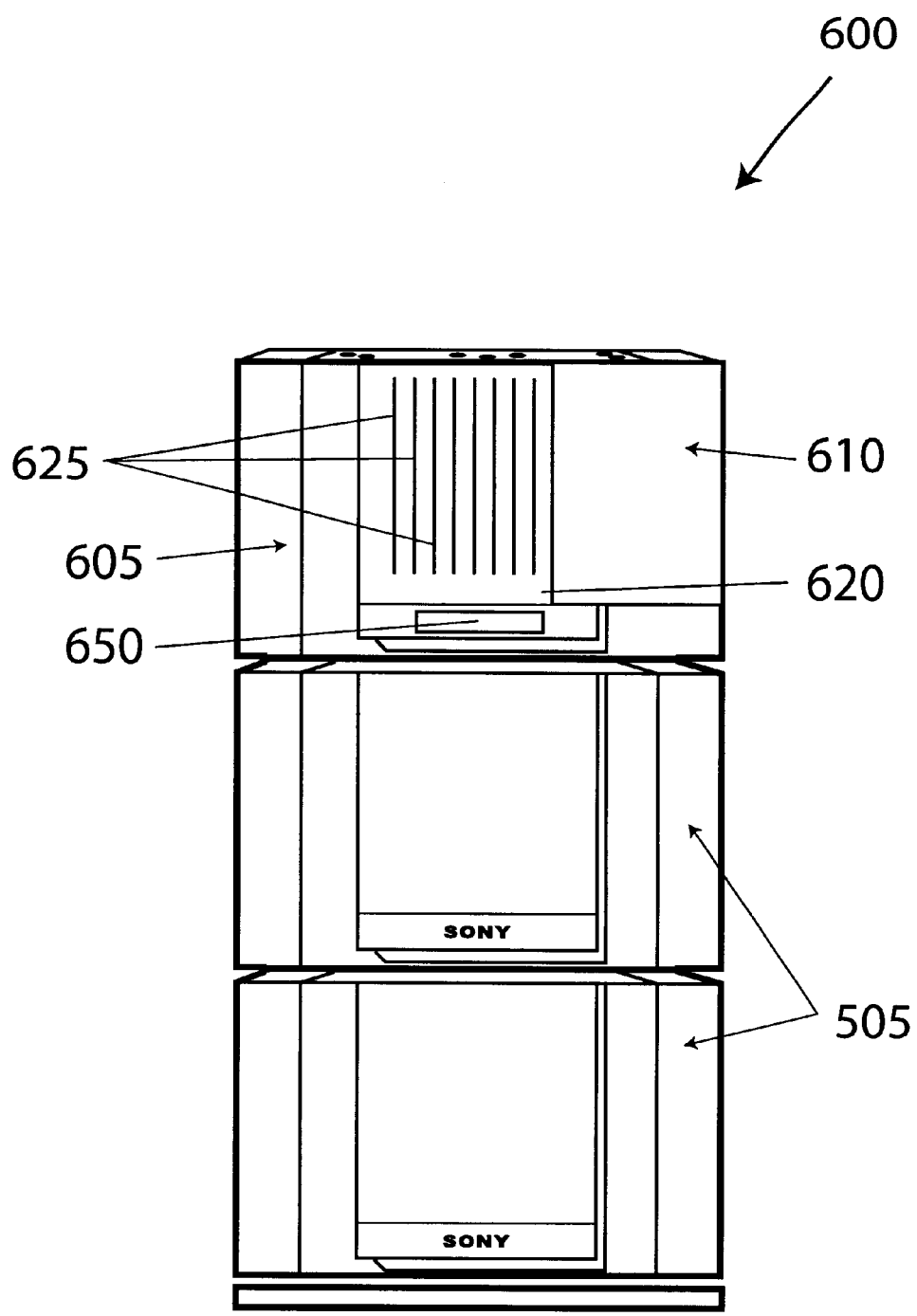
FIG. 6 is a front plan view of the apparatus of FIG. 5 operating in an alternative mode.

FIG. 6 depicts a multi-unit, multi-disc storage and integrated player 600 formed of integrated player units 605 and 505 and similar to that of player 500, but operating in a mode in which the control panel of integrated player unit 605 is not being utilized. As a result, display screen 420 of FIG. 5 is now a transparent display screen 620, thereby allowing visual access to the internal workings of integrated player unit 605, as well as a portion of the plurality of discs 625 maintained therein. Player unit 605 contains a housing 610, and a disc loading port 650, similar to the corresponding structure in FIGS. 4 and 5. The remaining structure and operation of multi-unit integrated player 600 is similar to that of player 500.

Figure 7:
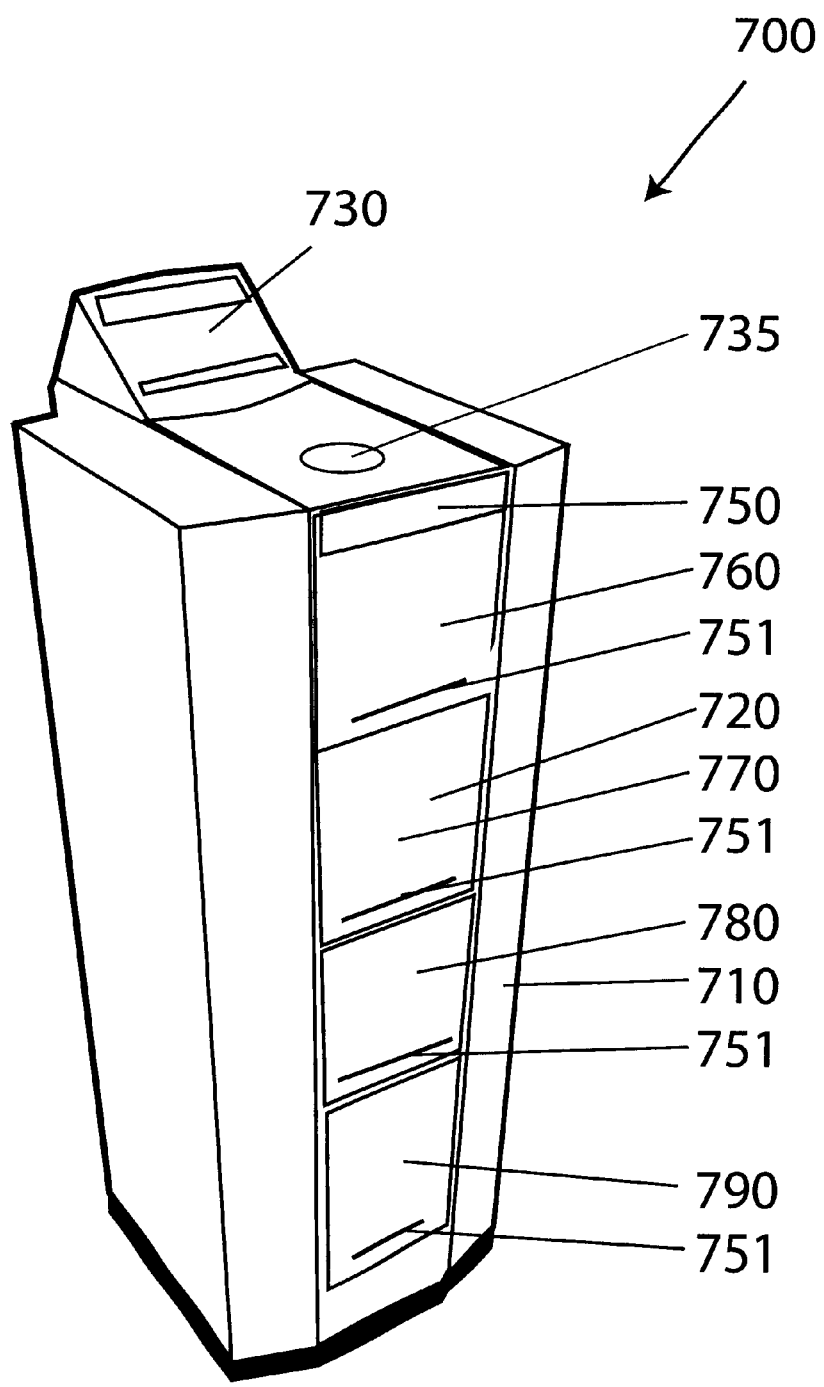
FIG. 7 is a perspective view of a single housing multi-unit, multi-disc storage and integrated player constructed in accordance with a third embodiment of the invention.

Reference is next made to FIG. 7 which depicts a single housing multi-unit, multi-disc storage and integrated player 700 constructed in accordance with a third embodiment of the invention. Single housing player 700 is formed of a housing 710, which includes in a non-modular fashion, player units 760, 770, 780 and 790. Each of these player units services a plurality of discs stored therein in vertical fashion, and in a preferred embodiment, each player services 50 discs, such as CDs, stored in a carousel. Player units 760, 770, 780 and 790 operate behind a single integrated glass screen 720 which may be provided of a transparent material, a translucent material, or a material which may be changed from transparent to translucent based upon the operational status of player 700. Player 700 is further provided with a control panel 735, and an integrated display screen 730 for providing a limited integrated user interface. As noted above with respect to the prior embodiments, using this limited integrated user interface, the user can select particular discs, shuffle through various discs, selected discs for future play and the like, in view of information about the discs displayed on display screen 720. To load discs into player 700, glass screen 720 slides from its position in from all of the stored CDs to a position left or right and allowing access to each of the CDs contained therein. Thus, a user can easily load or unload any of the desired disks.

Alternatively, if a vertical storage arrangement is used a single disc loading port 750 is provided in order to load discs into the player units of integrated player 700. Additionally, individual disc or multi-disc cartridge loading ports 751 may be provided, if desired.

As noted above, integrated player 700 contains all components necessary to play CDs and other media, as well as an AM/FM tuner, and the like. Thus, only speakers need be connected to the player for audio playback. Alternatively, speakers may be integrated with the player. Additionally, integrated player 700 is adapted to be connected to either a television set or a personal computer to provide an extended external user interface allowing for various other features of control by a user as will be noted below. Also, it is contemplated that other players or player units may be electrically coupled to integrated player 700 to increase the storage capacity thereof.

Figure 8:
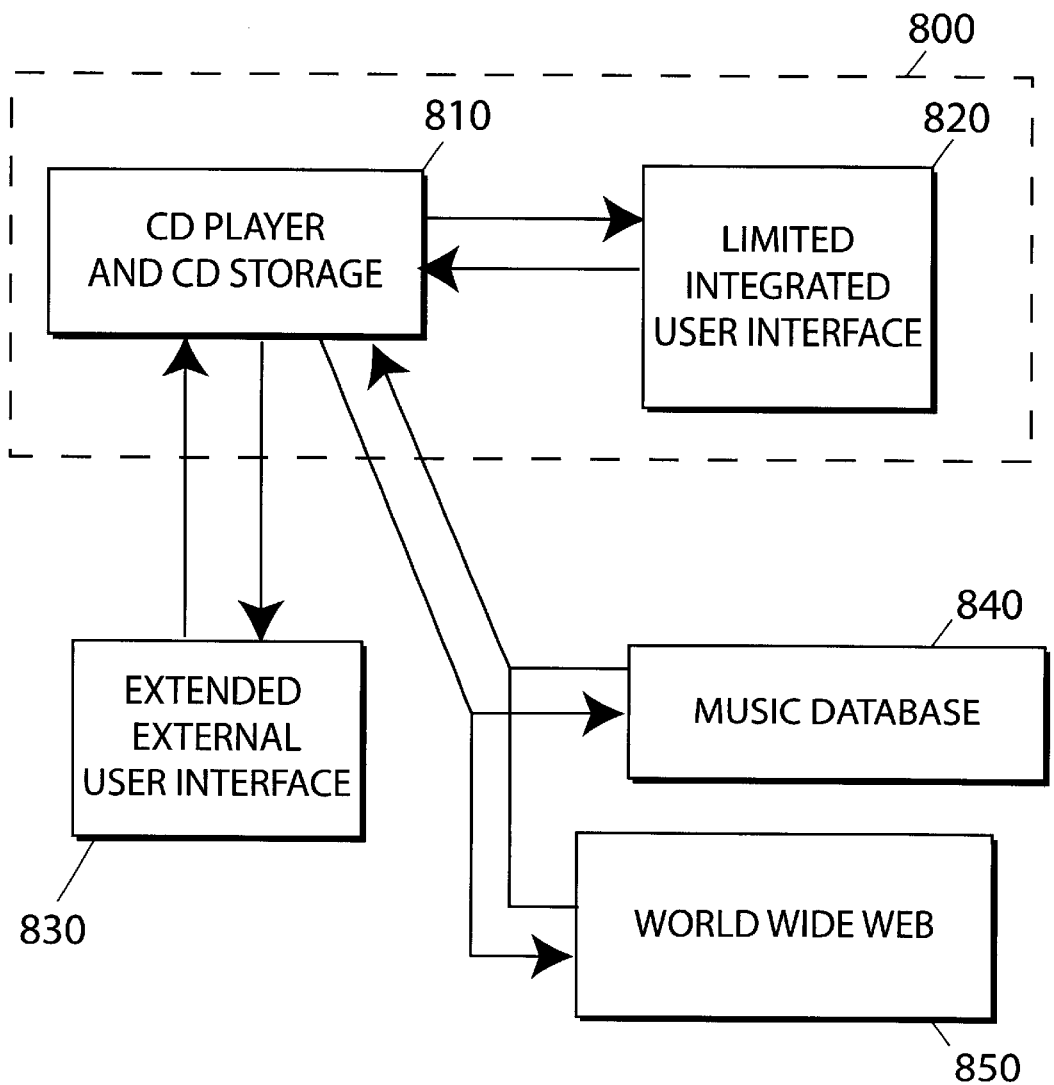
FIG. 8 is a block diagram depicting the relationship between a multi-disc storage and integrated player constructed in accordance with the invention and external interfaces and information sources.

Reference is next made to FIG. 8 which schematically depicts the relationship between any one of the integrated players or integrated player units described above in any of the embodiments of the invention, and an extended external user interface and other external connections contemplated by the invention. As illustrated, a multi-disc storage and integrated player 800 comprises a multi-disc storage and integrated player unit 810 and a limited integrated user interface 820. Player 800 may be similar to the players shown in FIGS. 2–7 or to the unit shown in FIG. 1. As is further shown in FIG. 8, player 800 is adapted for two-way communication with an extended external user interface 830, a music data base 840, and the worldwide web through a web connection 850, among other possible connections.

The coupling of integrated player 800 to music database 840 will first be described. As a plurality of discs are loaded within integrated player 800, it may be difficult for a user to keep track of the identity of each of the stored discs. Additionally, after being loaded, typically a user will not want to retain all of the disc containers (i.e. the "jewel boxes"); but these containers include art work from the cover, liner notes, and other information regarding the discs to which the user may want to refer each time that disc is played. If the containers are discarded when the discs are loaded into the player, access to such information no longer is available.

Music database 840 includes the information that otherwise would be derived from the disc containers; and preferably includes standard and updated information regarding all commercially available discs on the market. This information might include all liner notes, video pictures of the album cover, play list, information regarding the artist, audio samples of tracks from other discs by the same artist or of the same genre, advertisements for related material or equipment, and other updated information associated with a particular disc. This music database ideally is maintained in an offsite location, and is accessed by player 800 via a DSS satellite system, telephone modem, cable system, or other conventional communication system.

After loading a plurality of discs into player 800, upon a prompt from the user, or after a predetermined amount of time of nonuse, the player 800 automatically connects to music database 840 and downloads and stores the available information regarding each of the discs currently loaded therein. Thereafter, when using limited integrated user interface 820, an associated display screen displays additional updated textual information not previously able to be displayed from simply reading the disc. This updated textual information may include liner notes and other artist or related disc information. The user may scroll or page through the information regarding each disc stored in integrated player 800 while a disc is playing, so as to be prepared to select discs to be played at a later date, or simply to view the identities of other information associated with the discs contained within the integrated player.

Integrated player 800 is also adapted to be coupled with expanded external user interface 830, which may be a television set having a remote keyboard or remote control commander, a personal computer or the like, and which provides additional features over that of limited integrated user interface 820, such as displaying cover art from each of the CD discs, song lists, liner notes, and other information or news about the artist or CD disc as may be retrieved from music database 840. Additionally, expanded external user interface 830 allows a user to operate integrated player 800 in a graphic interface mode, for example, allowing a user to select a particular disc to be played by selecting the cover art associated therewith. Expanded external user interface 830 allows a user to design play lists for future use, assign names to specific play lists and save these names in memory, so that particular user-selected groups of songs may be replayed at any time simply by selecting the assigned names from memory. In addition, extended external user interface 830 may display various updated news and advertisements, or other audio, video or textual information regarding the artist of the disc which is being played, such as upcoming concert dates, audio tracks of new music releases from the same artist or from a similar genre, or the like. This display may, for example, appear as a "ticker" at the bottom of the display screen.

The expanded external user interface 830 may be used on a more advanced level, such as by monitoring the artists and genre of the discs loaded within integrated player 800 and the play frequency of these discs and collecting statistical information based upon the loaded discs and play frequency thereof. Particular information and advertisements from music database 840 may be downloaded based upon the recognition of the type of music, or the particular artist from the statistical information, that the user prefers. For example, if several discs from a particular artist are stored in integrated player 800, or if particular discs are played numerous times, expanded external user interface 830 operates to retrieve and display additional, more indepth information regarding the artist or the discs from music database 840. Thus, expanded external user interface 830 enables integrated player 800 to download from music database 840 large amounts of updated textual, graphic or audio information from music database 840, to store this information internally, and to allow the user to view this information, and to generate play lists based thereon.

In addition to displaying additional information regarding particular artists or discs from music database 840, expanded external user interface 830, upon recognizing artists and/or genres of music that are preferred by the user, is operable to identify and display web site links within web connection 850, from which the user may retrieve additional information regarding particular discs, artists, genres of music or the like. The expanded external user interface provides a worldwide web link to each of the websites of each singer/artist when a disc by that artist is playing, or when that disc has been selected from memory to be viewed. Additionally, information relating to concerts by a particular artist, such as links to ticket sellers on the web or other information providers might be provided automatically based upon either user preference or the determination by expanded external user interface 830 of the genres of music, and/or artists most often listened to by the user.

It is appreciated from the foregoing that a user may load a plurality of discs into integrated player 810, may view limited information by way of limited integrated user interface 820 for quick play of a previously loaded disc, may access additional information by way of expanded external user interface 830 so as to generate play lists, store play lists for future use, and view information regarding CD jackets, artists, audio clips, concert information or the like. Thus, integrated player 800, with appropriate interconnections as aforementioned, operates as a personalized music player and information center.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawing shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed:

1. A recording media storage and player unit, comprising:
   playback means for playing back data retrieved from a recording medium maintained at said recording media storage and player unit;
   communication means for obtaining from an external database continually updated expanded information associated with said data retrieved from said recording medium, but generated independently of said retrieved data, recording media or recording media storage and player unit;
   memory means for storing said expanded information within said recording media storage and player unit;
   operation means for directing the operation of said recording media storage and player unit based upon at least a portion of said expanded information to perform at least one of obtaining additional expanded information and selecting playback of said recording medium; and
   display means for displaying at least a portion of said expanded information when said data retrieved from said recording medium is played back.

2. The recording media storage and player unit of claim 1, wherein said data retrieved from said recording medium is audio data.

3. The recording media storage and player unit of claim 2, wherein said expanded information comprises a list of songs recorded on said recording medium.

4. The recording media storage and player unit of claim 3, further comprising a user interface operable by a user to select one song from said list of songs from said expanded information displayed on said display means.

5. The recording media storage and player unit of claim 4, wherein said display means is maintained in a transparent state when said user interface is not in use, affording visual access to the internal construction of said recording media storage and player unit, and is maintained in an opaque state, allowing textual information to be displayed thereon when said user interface is in use.

6. The recording media storage and player unit of claim 1, further comprising storage means for storing a plurality of recording media.

7. The recording media storage and player unit of claim 6, wherein expanded information is obtained for each of said plurality of recording media stored within said storage means.

8. The recording media storage and player unit of claim 7, wherein said display means is adapted to display said expanded information associated with one of said plurality of recording media stored within said storage means which is different than the recording medium which is being played back.

9. The recording media storage and player unit of claim 8, wherein said expanded information for each of said recording media includes at least a list of songs recorded on said respective recording medium.

10. The recording media storage and player unit of claim 9, further comprising a user interface for allowing a user to view each list of songs associated with each recording medium and to select at least one song from a recording medium which is different than the recording medium being played back for future reproduction.

11. The recording media storage and player unit of claim 6, further comprising a control panel selectively positionable between a first position and a second position; and wherein said display means is maintained in a transparent state, affording visual access to said storage means, when said control panel is positioned in said first position, and is maintained in an opaque state, allowing textual information to be displayed thereon, when said control panel is positioned in said second position.

12. The recording media storage and player unit of claim 6, further comprising coupling means, for coupling together a plurality of recording media storage and player units, thereby increasing the effective capacity of said storage means.

13. The recording media storage and player unit of claim 12, further comprising a user interface associated with one of said plurality of recording media storage and player units for controlling the operation of said plurality of coupled recording media storage and player units.

14. The recording media storage and player unit of claim 1, wherein said recording medium is a CD disc.

15. A multi-recording media storage and player unit, comprising:
   storage means for storing a plurality of recording media at said multi-recording media storage and player unit;
   playback means for replaying data retrieved form one of said plurality of recording media,
   communication means for obtaining from an external database continually updated expanded information associated with each of said plurality of recording media, but generated independently of said retrieved data, recording media or recording media storage and player unit;
   memory means for storing said expanded information within said multi-recording media storage and player unit;
   display means for displaying said expanded information; and
   a user interface for controlling said display means and the operation of said multi-recording media storage and player unit in accordance with at least a portion of said expanded information to perform at least one of obtaining additional expanded information and selecting playback of said recording medium.

16. The multi-recording media storage and player unit of claim 15, wherein each of said recording media is a CD disc and said retrieved data is audio data.

17. The multi-recording media storage and player unit of claim 16, wherein said expanded information associated with each recording medium includes at least textual information and graphic art associated with each of said CD discs.

18. The multi-recording media storage and player unit of claim 17, wherein said user interface displays said graphic art associated with at least one of said CD discs and enables said user to select a CD disc to be played back by selecting said associated cover art.

19. The multi-recording media storage and player unit of claim 18, wherein said user interface is operable to designate a plurality of songs from a plurality of CD discs to create a playlist.

20. The multi-recording media storage and player unit of claim 19, further comprising additional storage means for storing said created playlist and identifying the stored playlist with a user-defined name.

21. The multi-recording media storage and player unit of claim 16, wherein said user interface displays said expanded information associated with each of said plurality of CD discs.

22. The multi-recording media storage and player unit of claim 21, wherein said expanded information includes at least liner notes associated with each of said CD discs.

23. The multi-recording media of claim 21, wherein said expanded information includes at least updated information associated with an artist of each of said CD discs.

24. The multi-recording media storage and player unit of claim 23, wherein said expanded information includes at least audio data of additional songs of the artist of said CD disc.

25. The multi-recording media storage and player unit of claim 21, wherein said multi-recording media storage and player unit accumulates statistical information regarding the CD discs stored in said storage means and a frequency at which each of said CD discs is replayed; and said user interface retrieves specific expanded information based upon said accumulated statistical information.

26. The multi-recording media storage and player unit of claim 21, wherein said expanded information comprises links to web addresses associated with each of said plurality of CD discs.

27. The multi-recording media storage and player unit of claim 21, wherein at least one additional multi-recording media storage and player unit is coupleable with said multi-recording media storage and player unit to increase the effective capacity of said storage means.

28. The multi-recording media storage and player unit of claim 27, wherein said user interface displays said expanded information associated with each of said CD discs stored in both said multi-recording media storage and player unit and said at least one additional multi-recording media storage and player unit.

29. A multi-recording media storage and player, comprising:
   a multi-recording media unit including:
   storage means for storing a plurality of recording media at said multi-recording media unit;
   playback means for replaying data retrieved from one of said plurality of recording media;
   display means for displaying information associated with each of said plurality of recording media;
   a control panel for controlling said multi-recording media unit based upon at least a portion of continually updated expanded information retrieved from an external database associated with said data retrieved from said recording medium, but generated independently of said retrieved data, recording media or recording media storage and player unit; and
   coupling means for coupling at least one additional multi-recording media unit to said first-mentioned multi-recording media unit, said control panel of said first-mentioned multi-recording media unit also controlling said additional multi-recording media unit, said display means also displaying information associated within each of a plurality of discs stored within said additional multi-recording media unit.

30. The multi-recording media storage and player of claim 29, wherein said first-mentioned multi-recording media unit further comprises:
   an AM/FM tuner; and
   a minidisc loading port.

31. The multi-recording media storage player of claim 30, wherein said retrieved data is recorded on a minidisc loaded within said loading port.

32. The multi-recording media storage and player of claim 29, wherein said display means is transparent when said control panel is not in use, thereby affording a view of the internal workings of said multi-recording media unit.

* * * * *